US010205417B2

(12) United States Patent
Chapman et al.

(10) Patent No.: US 10,205,417 B2
(45) Date of Patent: Feb. 12, 2019

(54) AUTOMATED COMMISSIONING AND INSPECTION FOR PV SYSTEMS

(71) Applicant: SunPower Corporation, San Jose, CA (US)

(72) Inventors: Patrick L. Chapman, Austin, TX (US); Anant Kumar Singh, Richardson, TX (US)

(73) Assignee: Enphase Energy, Inc., Petaluma, CA (US)

(*) Notice: Subject to any disclaimer, the term of this patent is extended or adjusted under 35 U.S.C. 154(b) by 184 days.

(21) Appl. No.: 15/087,594

(22) Filed: Mar. 31, 2016

(65) Prior Publication Data
US 2017/0288599 A1 Oct. 5, 2017

(51) Int. Cl.
G05B 15/02 (2006.01)
H02S 50/00 (2014.01)
H02S 10/00 (2014.01)
G06Q 30/00 (2012.01)
G06Q 50/06 (2012.01)
H02J 3/38 (2006.01)
H02J 13/00 (2006.01)
G06F 17/00 (2006.01)
H02J 3/32 (2006.01)

(52) U.S. Cl.
CPC ............ H02S 10/00 (2013.01); G05B 15/02 (2013.01); G06Q 30/018 (2013.01); G06Q 50/06 (2013.01); H02J 3/383 (2013.01); H02J 13/002 (2013.01); H02J 13/0062 (2013.01); H02J 13/0086 (2013.01); H02S 50/00 (2013.01); H02J 3/32 (2013.01)

(58) Field of Classification Search
CPC ......... G05B 15/02; H02S 50/00; H02S 20/32; H02S 10/00; H02S 50/10; G06F 17/00; G06F 9/54
USPC .......................................... 700/287
See application file for complete search history.

(56) References Cited

U.S. PATENT DOCUMENTS

| 8,581,441 | B2 | 11/2013 | Rotzoll | |
|---|---|---|---|---|
| 2015/0001963 | A1 | 1/2015 | Georgopapadakos | |
| 2015/0001964 | A1 | 1/2015 | Georgopapadakos | |
| 2016/0036234 | A1 | 2/2016 | Del Olmo | |
| 2016/0036372 | A1 | 2/2016 | Hoepfner | |
| 2016/0036373 | A1 | 2/2016 | Hoepfner | |
| 2016/0036381 | A1* | 2/2016 | Kromer | H02J 3/383 700/287 |

* cited by examiner

Primary Examiner — Michael J Brown
(74) Attorney, Agent, or Firm — Moser Taboada

(57) ABSTRACT

An electric system includes a local power controller and solar panel system that includes a plurality of solar modules on one or more branch circuits. A method for commissioning the electric system includes an installer using a commissioning device to send and receive information from a remote system and the local power controller performing an automatic self-test of the electric system. The results of the self-test may be packaged with photographs and measurements of the electric system and sent to a remote system where an inspector can inspect the electric system remotely. After receiving approval by the inspector, the local power controller may automatically activate each branch circuit of the electric system and thus enabling the electric system to generate electricity.

20 Claims, 11 Drawing Sheets

AUTOMATED COMMISSIONING AND INSPECTION FOR PV SYSTEMS

GOVERNMENT LICENSE RIGHTS

This invention was made with government support under DE-EE0006035-SunPower (SunPower subcontract), through DE-EE0006035 (Fraunhofer CSE prime contract) awarded by the United States Department of Energy. The government has certain rights in the invention.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

In addition to PV modules, PV module systems include additional hardware. Such hardware may include inverters, power meters, and PV module system controllers. When these PV modules and additional hardware are installed at a site (e.g., the roof of a building, a field, a carport, etc.) in many jurisdictions the system must be commissioned and approved by an inspector prior to operation. It may be advantageous to use portions of the PV module system to automate portions of the commissioning and inspection process and also facilitate communication with the inspector.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

SUMMARY

Figure 1:
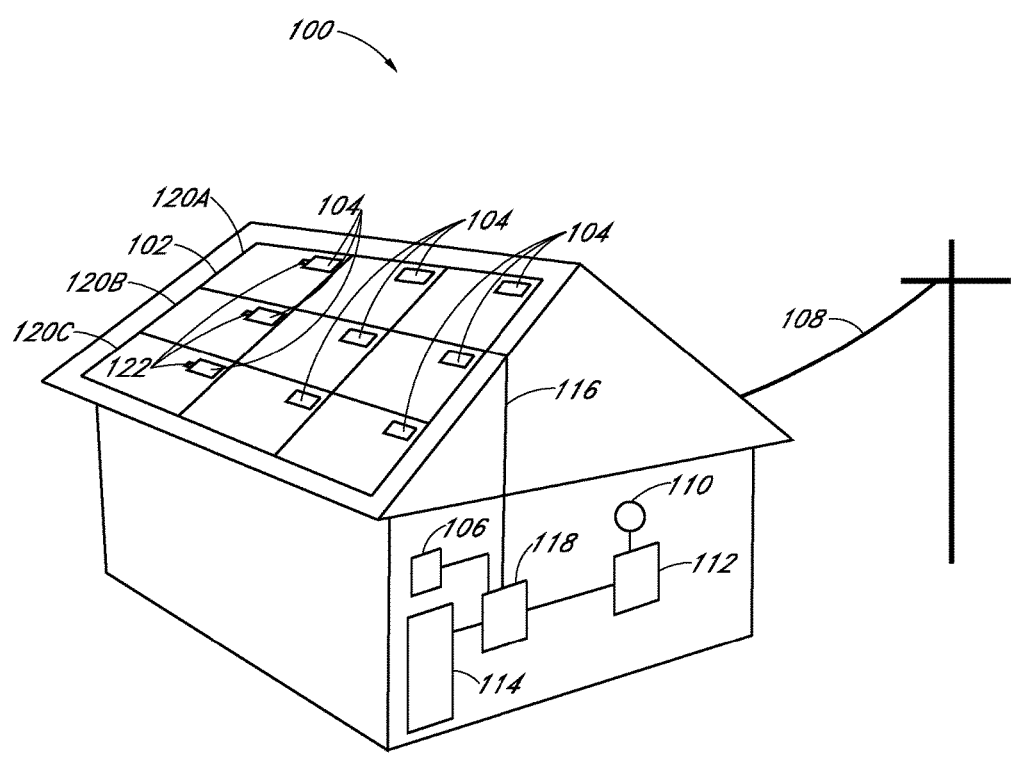
FIG. 1 illustrates an example electric system in accordance with the presently described embodiments.

Embodiments may include methods for commissioning an electric system with features comprising: installing the electric system, wherein the electric system includes: a local solar power controller, and a first branch circuit in communication with the local solar power controller, and wherein the first branch circuit includes a first branch controlled switch and a plurality of photovoltaic (PV) modules; activating the local solar power controller; receiving, at a commissioning device, an identifier of the electric system; receiving, at the local power controller, site design data from a remote system, wherein the site design data relates to a predetermined electric system site design of the electric system; activating, with the local solar power controller, the first branch circuit by closing the first branch controlled switch; collecting, with the local solar power controller, first data relating to the PV modules of the first branch circuit; deactivating, with the local solar power controller, the first branch circuit by opening the first branch controlled switch; analyzing, with the local solar power controller, the first data and site design data to determine whether the electric system conforms to the predetermined electric system site design; and when the electric system conforms to the predetermining electric system site design: generating a self-test pass indicator, transmitting the self-test pass indicator from the local solar power controller to the commissioning device, receiving at the commissioning device one or more indicators of physical characteristics of the electric system, and transmitting, with the commissioning device, the self-test pass indicator and the one or more indicators of physical characteristics of the electric system to the remote system.

Embodiments may also include automatic site commissioning methods for commissioning an electric system with features comprising: receiving, at the local solar power controller, site design data relating to a predetermined electric system site design of the electric system; activating, with a local solar power controller, a first branch circuit by closing a first branch controlled switch; collecting, with the local solar power controller, first data relating to photovoltaic (PV) modules coupled to the first branch circuit; deactivating, with the local solar power controller, the first branch circuit by opening the first branch controlled switch; and analyzing, with the local solar power controller, the first data and site design data to determine whether the electric system conforms to the predetermining electric system site design.

In still further embodiments, an electric system may comprise: a first branch circuit, wherein the first branch circuit includes a first branch controlled switch and a plurality of photovoltaic (PV) modules; and a local solar power controller including: a processor, and a tangible, computer-readable memory storing instructions that when executed by the processor cause the local solar power controller to: receive site design data relating to a predetermined electric system site design of the electric system, activate the first branch circuit by closing the first branch controlled switch, collect first data relating to PV modules coupled to the first branch circuit, deactivate the first branch circuit by opening the first branch controlled switch, and analyze the first data and site design data to determine whether the electric system conforms to the predetermined electric system site design.

DETAILED DESCRIPTION

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology

The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112, sixth paragraph, for that unit/component.

"First," "Second," etc. As used herein, these terms are used as labels for nouns that they precede, and do not imply any type of ordering (e.g., spatial, temporal, logical, etc.). For example, reference to a "first" branch circuit does not necessarily imply that this branch circuit is the first branch circuit in a sequence; instead the term "first" is used to differentiate this branch circuit from another branch circuit (e.g., a "second" branch circuit).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

FIG. 1 is a diagram of an example electric system 100. As discussed herein, the electric system 100 may be a solar power generation system. The electric system 100 includes a solar panel system 102 including one or more photovoltaic modules, one or more inverters 104 coupled to the PV modules, and a photovoltaic supervisor system ("PV supervisor," "supervisor," or "local solar power controller) 106. The one or more inverters 104 may be string inverters or "microinverters" (MI) as discussed in further detail below. The electric system 100 also includes a connection 108 to a utility grid, an electric meter 110 for the connection 108 to the utility grid, an aggregation panel ("agg panel") 118, and an electric panel 112 for the electric system 100. Additionally, the electric system 100 may include an energy storage device 114 (e.g., one or more batteries coupled to a control system of one or more computers). The inverters 104, PV supervisor 106, connection 108 to a utility grid, electric meter 110, agg panel 118, electric panel 112, and energy storage device 114 may be coupled together by a shared power line 116.

The solar panel system 102 may be wired together in one or more branch circuits 120. The electric power system 100 shown in FIG. 1 includes three branch circuits 120A, 120B, and 120C, although it will be understood that an electric power system 100 may include fewer branch circuits (e.g., one branch circuit, two branch circuits) or more branch circuits (e.g., four branch circuits, five branch circuits). The number of branch circuits 120 may be a requirement of the electric system 100 depending on the number of PV modules installed in the electric system 100 and the specifications of the various components of the electrical system 100 in order to ensure that the amount of voltage, current, and/or power on any one branch circuit 120 does not exceed safe operating parameters. For example, in some embodiments no more than 12 PV modules and attached MIs 104 may be included on a single branch circuit 120, so a solar panel system 102 with 1-12 PV modules and attached MIs 104 may require on branch circuit, a solar panel system 102 with 13-24 PV modules and attached MIs 104 may require two branch circuits 120, a solar panel system 102 with 25-36 PV modules and attached MIs 104 may require three branch circuits 120, etc.

As discussed herein, an end cap 122 may be coupled to the last MI 104 on a branch circuit 120. The end cap 122 may include circuitry (e.g., a printed circuit board including one or more integrated circuits) and/or other electrical components (e.g., resistors, jumpers, transistors, diodes, etc.) that may enable the PV supervisor 106 to determine the presence of the end cap 122 on the branch circuit 120. For example, in a first embodiment, the end cap 122 may include a controller that transmits a code over a PLC protocol to the PV supervisor 106 when polled by the PV supervisor 106 during a discovery routine performed by the PV supervisor 106. In second embodiment, the end cap 122 may include one or more jumpers which connect a plurality of pins on the MI 104, and the PV supervisor 106 and/or MI 104 may detect that these pins have been shorted. The end cap 122 may be adapted to be plugged into the MI 104 via a port or plugged into a cable coupled to the MI 104. In some embodiments, the end cap 122 may be installed in the same port or coupled to the same cable that would be coupled to a next MI 104 on the branch circuit 120 if the MI 104 receiving the end cap 122 was not the last MI 104 on the branch circuit 120.

The shared power line 116 may be a split-phase alternating current (AC) power line operating at the standard voltage (e.g., 110 V, 120 V, 208 V, 220 V, 230 V, 240 V, etc.) and frequency (e.g., 50 Hz, 60 Hz) of the locality. For example, in the United States, the shared power line 116 may be configured for split-phase AC electricity at 240 V and 60 Hz. It will be understood that the disclosed embodiments are not limited to split-phase AC, but may also include single-phase AC or three-phase AC. The shared power line 116 may couple all of the AC components of the electric system 100 (e.g., inverters 104, PV supervisor 106, electric meter 110, agg panel 118, electric panel 112, energy storage device 114) to the utility grid via the connection 108. For the purposes of PLC communication discussed herein, this shared connection between the AC components of the electric system 100 may be referred to as a "PLC bus."

While FIG. 1 depicts a single electric system 100 on a single building, it will be understood that several electric systems 100 could be connected together, either directly by a shared power line 116, or via the utility grid. For example, a first electric system 100 (including a solar panel system 102, inverters 104, PV supervisor 106, etc.) could be installed at a first house on a street, and a second electric system 100 (including a solar panel system 102, inverters 104, PV supervisor 106, etc.) could be installed at a second house on the same street, or on a second street in the same neighborhood, or otherwise nearby. As a second example, a large building or campus may have more than one electric system 100 installed (e.g., on the roof, on a carport, on a ground mounted system) with each electric system 100 connected via a shared power line 116. In some embodiments, the first electric system 100 and the second electric system 100 are coupled to the same main electrical transformer via the utility grid and the electric system's 100 respective connections 108. Accordingly, the shared power line 116 of the first electric system 100 is electrically coupled to the shared power line 116 of the second electric system 100. As discussed herein, the PV supervisor 106 of each electrical system 100 may be configured to determine whether the shared power line 116 is currently being used for communication before broadcasting a message on the shared power line 116.

When the sun is shining on the solar panel system 102, the solar panel system 102 produces direct current (DC) electric power and provides the DC power to the inverters 104. In response, the inverters 104 produce AC power for consumption by loads on the electric system 100 or for providing to the connection 108 to the utility grid. When the loads on the electric system 100 consume more power than is provided by the solar panel system 102, the loads draw power from the connection 108 to the utility grid. When loads consume less power than is provided by the solar panel system 102, the solar panel system 102 can provide the excess power to the connection 108 to the utility grid and/or the energy storage device 114. Although FIG. 1 illustrates a grid-tied electric system 100, the systems and methods described in this specification can be applied in various other types of electric systems. Further, it will be understood that the electric system 100 may include other types of power generators (e.g., solar thermal power systems, wind turbines, steam turbines, diesel generators, etc.) instead or in addition to the solar panel system 102.

The one or more inverters 104 may be string inverters 104 or MIs 104. String inverters 104 are adapted to be connected to one or more photovoltaic modules in series or in parallel, receive the DC power generated by the photovoltaic modules, and output AC power. In some embodiments, the string inverter 104 may output the AC power it generates to the agg panel 118, which is in turn coupled to the load on the electric system 100 and/or the connection 108 to the utility grid as discussed herein. The electric system 100 may include one or more string inverters 104. In an electric system 100 that includes one or more string inverters 104, it may be advantageous to couple DC optimizers to each PV module in the solar panel system 102. Such DC optimizers may convert the relatively low voltage of each PV module to higher voltage for AC inversion. In addition to transforming the voltage from lower voltage to higher voltage, the DC optimizer may also communicate (e.g., transmitting a serial number of the DC optimizer or PV module) with inverter 104 and/or PV supervisor by modulating information onto the DC voltage using PLC techniques discussed herein or by direct wired or wireless communication.

In contrast, MIs 104 are dedicated to a single PV module, receive the DC power generated by that single PV module, and output AC power to the agg panel 112. MIs 104 may be connected in electrical parallel or electrical series to each other, thus the AC power generated by each MI 104 is combined and either consumed by the load on the electric system 100 or provided to the connection 108 to the utility grid. As discussed herein, the MIs 104 may communicate with the PV supervisor 106 via PLC techniques or by other wired or wireless connections. Each MI 104 may communicate a serial number associated with the MI 104 or the PV module to which the MI 104 is attached or respond to a message from the PV supervisor 106 asking for the presence of MIs 104 on the electric system 100 as discussed herein.

The PV supervisor 106 (also referred to herein as a local solar power controller) is a computing system configured, by virtue of appropriate programming, to monitor the solar panel system 102 and perform one or more actions based on monitoring the solar panel system 102. For example, the PV supervisor 106 can be configured for interfacing with net and sub meters, inverters 104, and other components of the system. In some examples, the PV supervisor 106 measures power, current, and/or voltage output by the solar panel system 102 and transmits measurements to a remote system, e.g., a homeowner's computer system, a building manager's computer system, or a solar panel manufacturer, installer, or inspector computer system. As discussed herein, the PV supervisor 106 can communicate with the inverters 104, electric meter 110, and energy storage device 114 using a PLC protocol on a shared power line 116 (e.g., to communicate serial numbers, MAC addresses, or other identifying indicators, operating condition, etc.). The PV supervisor 106 can be enclosed in a weatherproof housing for outdoor installation.

The agg panel 118 is coupled by the shared power line 116 to the branch circuit(s) 120 of the solar panel system 102, the PV supervisor 106, and the electric panel 112. The agg panel 118 may also be coupled to the energy storage device 114. The interior components of the agg panel 118 and interconnections between the agg panel 118 and the rest of the electric system 100 are discussed in more detail herein with regard to FIG. 4. As discussed herein, the agg panel 118 may be used to commission the electric system 100 in accordance with the disclosed methods in relation to FIGS. 7A-7C and 8A-8B. In some embodiments, the PV supervisor 106 and the agg panel 118 may be integrated into a single unit.

Figure 2:
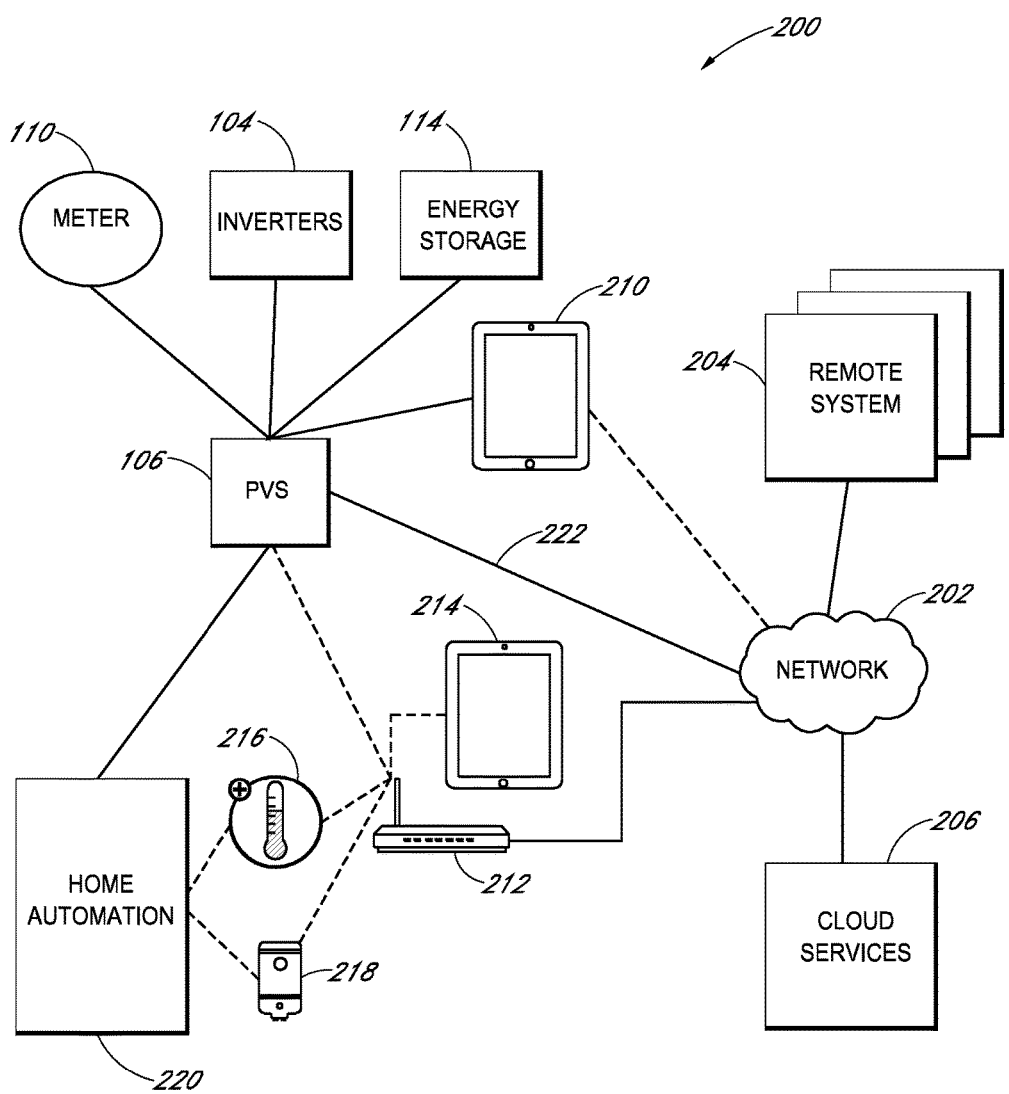
FIG. 2 illustrates an example environment for a photovoltaic supervisor system in accordance with the presently described embodiments.

FIG. 2 is a block diagram of an example environment 200 for the PV supervisor 106. The PV supervisor 106 can communicate with the inverters 104, electric meter 110, which can be a smart meter, and energy storage device 114 using a PLC protocol on a shared power line 116. Additionally or alternatively, the PV supervisor 106 can communicate with the electric meter 110 and energy storage device 114 using other wired or wireless connections discussed herein. Further, in addition to or alternative to the PLC techniques discussed here, the PV supervisor 106 may communicate with the inverters 104 using other wired (e.g., USB, Ethernet, etc) or wireless connections. The PV supervisor 106 may communicate over a data communications network 202, e.g., the Internet, with one or more remote systems 204 executing on a system of one or more computers and/or one or more computer servers providing cloud computing services 206 related to energy monitoring and management of the electric system 100. For example, the PV supervisor 106 may communicate with a first remote system 204 that can be accessed by a code inspector to approve and commission the electric system 100 as discussed herein, a second remote system 204 storing a database of design data for various electric systems 100 to access the design data corresponding to the cite at which the PV supervisor 106 is installed, and a third remote system 204 that may be accessed by a utility for ongoing remote inspection, evaluation, and/or control of the electric system 100. Of course it will be understood that the functions of the various remote systems 204 may be integrated into one server, or distributed among a cloud of remote servers.

The PV supervisor 106 can communicate, either directly or over a data communications network, with one or more additional components of the system, including a commissioning device 210, e.g., a tablet computer or other appropriate computing device used to verify properties of a solar system after installation and a wireless access point 212 for accessing, e.g., a local area network (LAN). The commissioning device 210 is discussed in further detail herein with reference to FIGS. 4, 7A, 7B, and 7C, and may also be capable of communication with the remote server 204 and cloud services over a wired or wireless connection to the network 202. The PV supervisor 106 can communicate, using the wireless access point 212, with a customer device 214 such as a tablet computer; the remote system 204 and the cloud services 206 using the network 202; a smart thermostat 216; one or more controllable electric loads 218; and a home automation system 220. The home automation system 220 can include one or more computers providing one or more services such as personal safety applications and appliance control applications.

In operation, the PV supervisor 106 can take energy measurements and transmit the energy measurements to the remote system 204. The PV supervisor 106 can transmit the energy measurements to other systems, e.g., the cloud services server 206, which can be configured to provide computing services for, e.g., home automation. In some examples, the remote system 204 and/or the cloud services server 206 can be configured for remote inspection and commissioning, configuration modification, and troubleshooting of the PV supervisor 106, e.g., using a cloud-hosted web application. Alternatively or additionally, the PV supervisor 106 may make diagnostic measurements of the electric system 100 and transmit such diagnostics to the remote system 204 and/or cloud services server 206.

Some applications depend on the energy measurements or electric system diagnostics from the PV supervisor 106. For those applications, it can be useful for the PV supervisor 106 to be able to communicate on multiple communication channels. For example, the PV supervisor 106 can be configured to transmit energy measurements to the remote system 204. The PV supervisor 106, in normal operation, transmits the measurements to the wireless access point 212, which routes the measurements to the remote system 204.

When the PV supervisor 106 determines that the wireless access point 212 is not available, e.g., due to malfunction, the PV supervisor 106 can switch from transmitting to the wireless access point 212 to transmitting over a cellular network 222. When the PV supervisor 106 determines that the cellular network 222 is not available, e.g., due to malfunction, the PV supervisor 106 can switch from transmitting on the cellular network 222 to another communications channel or protocol, e.g., a power line communications channel.

Various failover scenarios are possible. In general, the PV supervisor 106 is configured to communicate using more than one communications channel and to switch between channels in response to determining that a channel is not available for communication. In some examples, the PV supervisor 106 can determine that a channel is not available when an expected acknowledgement message is not received, or when a device, e.g., wireless access point 212, sends a message indicating that it is not available for communication.

Figure 3:
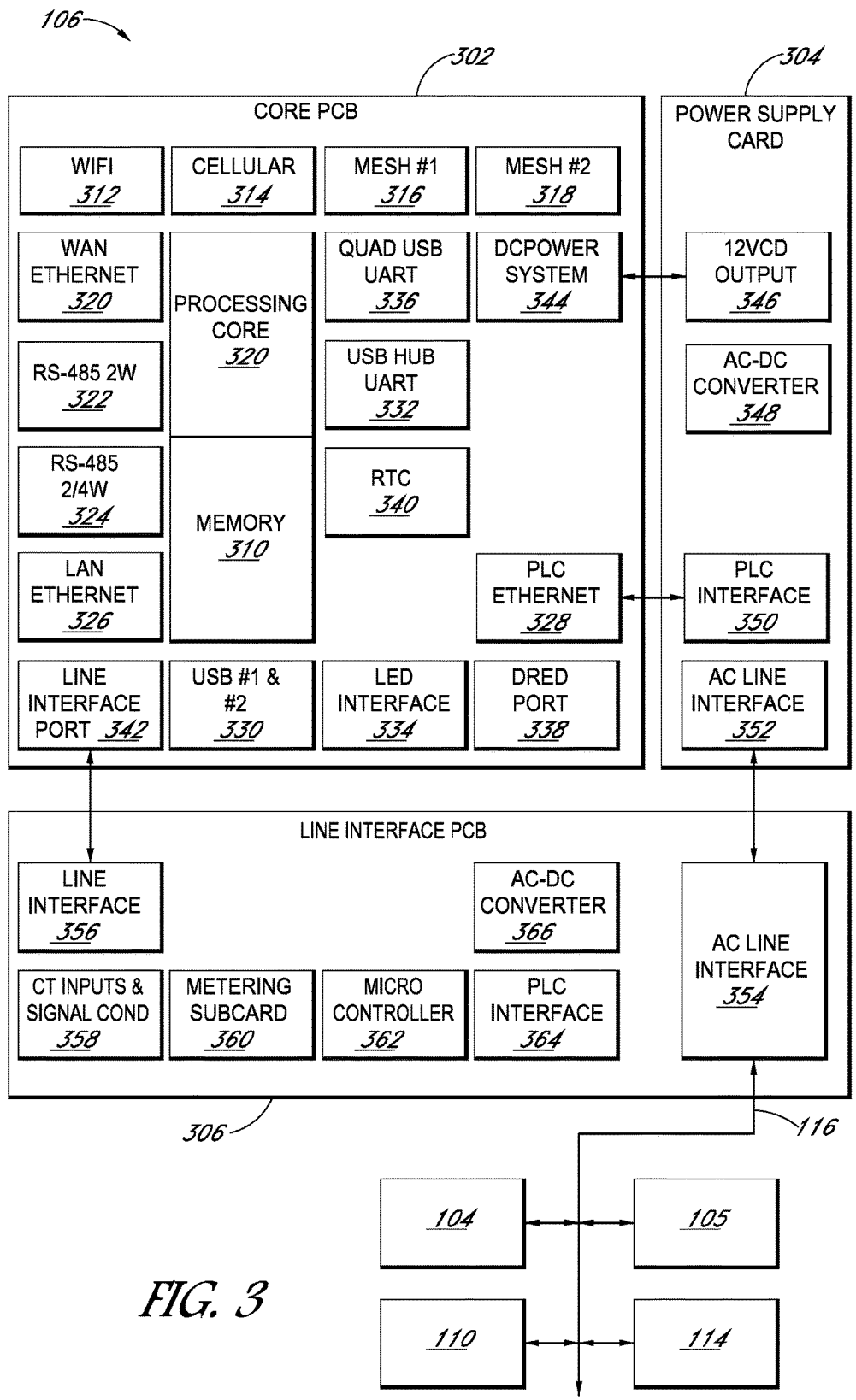
FIG. 3 illustrates a block diagram of an example photovoltaic supervisor system in accordance with the presently described embodiments.

FIG. 3 is a block diagram of an example PV supervisor 106. The PV supervisor 106 is illustrated as being implemented by electric components on three separate physical structures for purposes of illustration. The PV supervisor 106 can be implemented using any appropriate combination of one or more circuit structures, e.g., printed circuit boards (PCBs) and other types of cards.

The PV supervisor 106 includes a core PCB 302, a power supply card 304, and a line interface PCB 306 (e.g., an AC line interface). The core PCB 302 includes a processing core 308 and memory 310. The processing core can be one or more processors configured to execute, e.g., a LINUX kernel. The memory 310 can include, e.g., flash storage and dynamic random access memory. In operation, the processing core 308 executes software to cause the PV supervisor 106 to perform various functions, e.g., automatically commissioning the electric system 100 as discussed herein, taking measurements, transmitting measurements, switching communication channels in response to detecting lack of availability of communication channels, and executing control algorithms for other components.

The PV supervisor 106 includes a data communication system that includes wireless communication radios and wired communication circuits. As illustrated, the PV supervisor 106 includes, for wireless communication: a WiFi radio 312, e.g., an 802.11 (e.g., a, b, g, n, ac) WiFi radio; a cellular radio 314, e.g., a 3G/4G/LTE radio; and two separate mesh network radios 316 and 318, e.g., Zigbee radios for direct communications with smart meters and/or home automation devices. The PV supervisor 106 includes, for wired communication: a wide area network (WAN) Ethernet port (320); an RS-485 2 wire port 322; an RS-485 2/4 wire port 324; a LAN Ethernet port 326; and a power line communication (PLC) Ethernet port 328.

The core PCB 302 can include various other interfaces, e.g., first and second universal serial bus (USB) ports 330 and a USB hub 332 for expansion capabilities; a light emitting diode (LED) interface 334 for status indicators on an external enclosure or on-board LED indicators for an indoor enclosure; a quad USB universal asynchronous receiver/transmitter (UART) port 336, e.g., for supporting communication with the line interface PCB 306; and multi-purpose digital I/O connector 338 for grid control interface devices such as the demand response enabling device (DRED) interface, used in Australia, and Ripple Control, used in Germany, for receiving control signals from a utility. The core PCB 302 can include a real-time counter (RTC) 340, an electrically isolated line interface port 342 for connecting to the line interface PCB 306, and a DC power system interface 344 for connecting to the power supply card 304.

The core PCB 302 can be implemented using various custom or off-the-shelf communication components. For example, the core PCB 302 can be implemented using a wireless router processor. Such a processor can include a built-in 802.11n wireless radio and multiple Ethernet ports for LAN and WAN. To implement the PLC Ethernet 328, the core PCB 302 include a chipset for HOMEPLUG AV compatible networking over AC power lines. The cellular radio 314 can be implemented using a MiniPCI (USB) based internal, replaceable cellular communications card, suitable for domestic and foreign radio networks. The serial communications ports The power supply card 304 is configured to supply power to the PV supervisor 106 and includes a low voltage, e.g., 12 V DC, output 346, an AC-DC converter 348, a PLC interface 350, and an AC line interface 352. The line interface PCB 306 is configured to electrically couple to the electrical system 100 for metering, communication, diagnostics, etc. and includes an AC line interface 354 for coupling to the power supply card 304 and an AC line interface port 356 for coupling to the core PCB 302. The line interface PCB 306 also includes one or more measurement inputs 358 for coupling to, e.g., current transformers (CTs) for taking energy measurements. The measurement inputs 358 can include one or more signal conditioning circuits.

The line interface PCB 306 includes a metering subcard or metering circuit subsection 360 for taking energy measurements and a microcontroller 362 for, e.g., controlling the operation of the line interface PCB 306 and the communications functions of monitoring the shared power line 116 and relaying information related to the shared power line 116 to the core PCB 302. The line interface PCB 306 includes an AC-DC converter 366 and a PLC interface 364 that is separate from the PLC interface 350 used by the power supply card 304. It will be understood that the PLC band could be any of a number of frequencies can may be modulated on to the shared power line 116. For example, the PLC band may be located between 90 kHz and 115 kHz, or on any other suitable band. In some embodiments, the PLC band is centered on 109.2 kHz. It will be understood that government and utility regulations may determine the frequency of the PLC band.

The PV supervisor 106 can be configured to connect to the other devices (e.g., inverter 104, electric meter 110, energy storage device 114, etc.) in the electric system 100 using, e.g., the PLC interface 364. The PV supervisor 106 can push firmware upgrades to the other devices (e.g., inverter 104, electric meter 110, energy storage device 114, etc.) in the electric system 100. The PLC interface 364 may be configured to modulate and demodulate information on the shared power line 116. It will be understood that the PLC interface 364 may use any of a number of known modulation techniques. Such known modulation techniques include amplitude shift keying (ASK), amplitude and phase shift keying (APSK), continuous phase modulation (CPM), frequency-shift keying (FSK), multiple frequency-shift keying (MFSK), minimum shift keying (MSK), on-off keying (OOK), pulse-position modulation (PPM), phase-shift keying (PSK), quadrature amplitude modulation (QAM), single-carrier frequency division multiple access (SC-FDE), or Trellis modulation (TCM). The modulation technique used by the PLC interface 364 depends upon the modulation scheme used in the PLC protocol used by the electric system 100. Further, PLC communication over the shared power line 116 may be conducted at any of a number of symbol rates (e.g., 2400 baud, 4800 baud) depending in part on the capabilities of system hardware and operating conditions. For example, the PLC interface 364 may modulate and demodulate signals using binary FSK at 2400 baud or 4800 baud when the PLC protocol used by the electric system 100 requires binary FSK and the electric system 100 can accommodate transmissions a 2400 baud or 4800 baud. It will be understood that any device (e.g., inverter 104, electric meter 110, energy storage device 114, etc.) configured to communicate using the PLC protocol on the shared power line 116 may include its own modulator and demodulator.

In operation, the line interface PCB 306 provides a single point of installation for AC connectivity and for integrating PLC communications, e.g., inverter 104 PLC communications and networking/communication features of the core PCB 302. In some examples, the line interface PCB 306 supports various electric system installations, e.g., U.S. residential 120V, 208/240V split phase installations; provides safety isolation (SELV) between high voltage AC connections and low voltage (consumer electronics interconnections) from the core PCB 302; can include integrated AC line protection circuits, including fusing, varistors (e.g., metal-oxide varistors), and gas discharge tubes (GDTs), and provides AC voltage surge and transient protection; provides firmware processing of communications data to/from inverters 104 and data interchange to/from system software executing on the core PCB 302.

In some examples, the power supply card 304 is configured for a 100-250 V AC input range for worldwide operation. The power supply card 304 can output low voltage, e.g., 12 V DC for the core PCB 302, e.g., the main bus voltage of the core PCB 302. The power supply card 304 can include integrated AC line protection circuits, including fusing, varistors (e.g., metal-oxide varistors), and gas discharge tubes (GDTs). In some examples, the AC line protection circuits are also included in the line interface PCB 306, and the use of those AC line protection circuits can significantly benefit the integration of metering functionality. The power supply card 304 can include integrated PLC coupling transformers and a zero crossing detector circuit.

The PV supervisor 106 can be configured, by virtue of the various data communication components, to communicate in a variety of different scenarios. For example, the PV supervisor 106 can be configured to connect to three separate Zigbee networks running different protocols using the two mesh network radios 316 and 318, or two separate Zigbee networks running different protocols and one other network utilizing an 802.15.4 physical layer, e.g., a network using IPv6 over low power wireless personal area networks (6LoWPAN) or THREAD. For example, such connections can enable lost cost consumption (net) metering by connecting to a smart meter over a Zigbee SEP 1.X or 2.0 network while simultaneously communicating within a Zigbee home automation network and a Zigbee network with a proprietary protocol communicating with an inverter. Alternatively, the PV supervisor 106 can connect with a smart meter with a home automation network utilizing THREAD. In some examples, the PV supervisor 106 optionally includes one or more 802.15.4 radios.

In some examples, the PV supervisor 106 can connect to a LAN using WiFi while simultaneously acting as a WiFi access point to allow a user device to connect to allow configuration. For example, the PV supervisor 106 can serve as a local human-machine interface (HMI) over direct connection to the system's internet protocol (IP) address.

The PV supervisor 106 can be configured to switch between LAN and WAN connections and other connections, automatically, as appropriate, and the PV supervisor 106 can alter the amount and frequency of data transmitted depending on the type of connection. The PV supervisor 106 can be configured to connect to inverters and other power electronic devices using the RS-485 physical layer and proprietary protocols, e.g., Modbus RTU or Modbus TCP. Since the core PCB 302 can include two RS-485 ports 322 and 324, the PV supervisor 106 can support two such connections simultaneously which may use different protocols.

Figure 4:
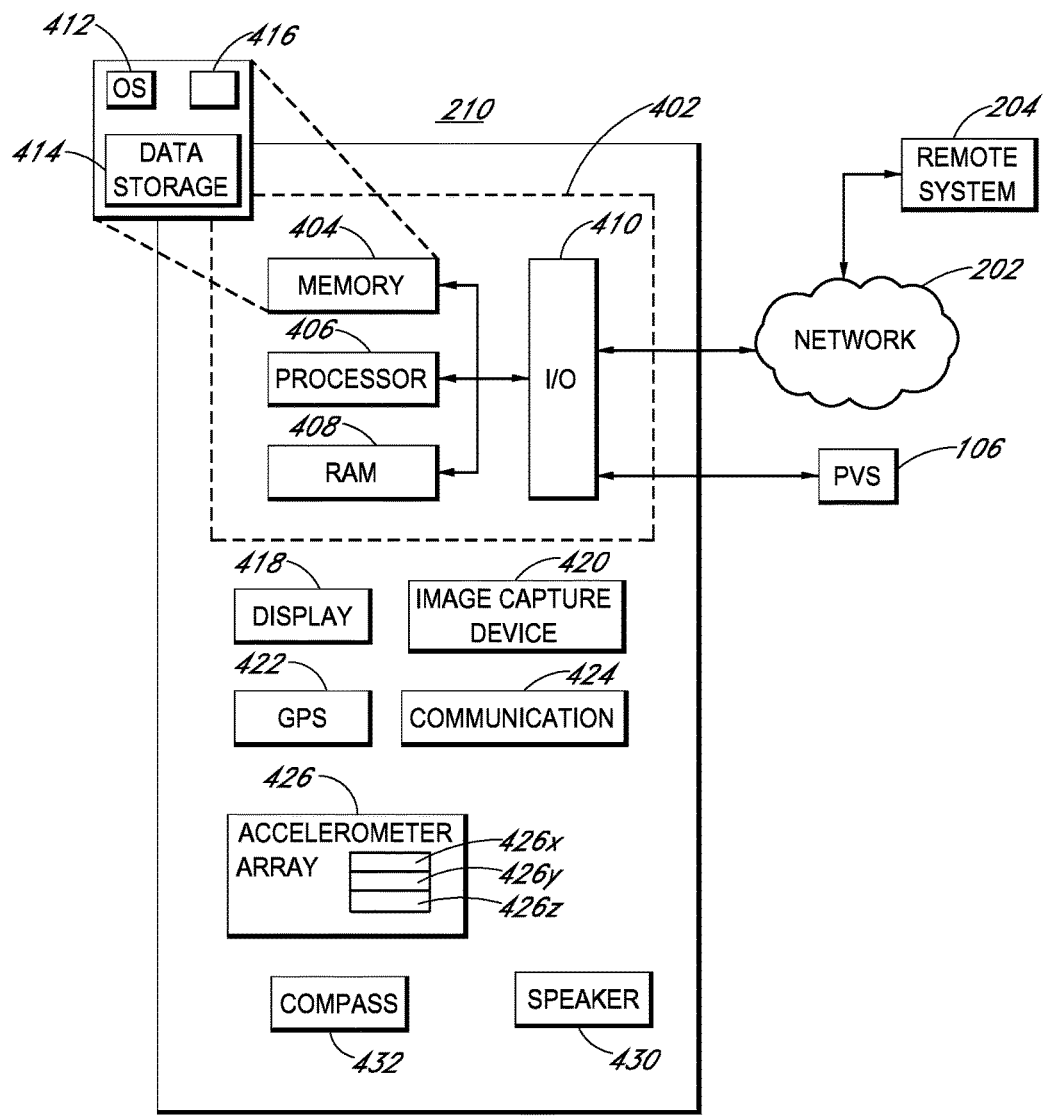
FIG. 4 illustrates a block diagram of an example commissioning device in accordance with the presently described embodiments.

Turning now to FIG. 4, a block diagram of various components of the commissioning device 210 is shown, according to some embodiments. The commissioning device 210 may be any of a number of portable electronic devices such as a smart phone, personal digital assistant, tablet computer, laptop computer, etc. The commissioning device 210 may include a controller 402, which may include a memory 404 (e.g., EEPROM, DRAM, flash memory, ROM, etc.), a processor 406, RAM 408, and I/O controller 410. The memory 404 may include computer readable instructions that when executed by the processor 406 cause the commissioning device 210 to implement an operating system 412, data storage 414 for storing identifiers of solar power systems, site design data, test results, visual/physical information, etc., and commissioning application 416 as discussed herein with reference to FIGS. 7A-7C. The I/O controller 410 may coordinate input and output between the user of the commissioning device 210, the various components of the commissioning device 210, and the network 202 and/or PV supervisor 106 over wired and/or wireless connections. Via the network 202, the commissioning device 210 may also communicate with one or more remote systems 204.

The commissioning device 210 may also include various components to implement the disclosed methods. The commissioning device 210 may include a display 418 (e.g., a touchscreen), one or more image capture devices 420, a Global Positioning System (GPS) receiver 422 (although other geospatial locating receivers may be used additionally or alternatively), a communications device 424, accelerometer array 426, speaker 430, and/or compass 432. The communications 424 may include any of a number of wired (e.g., USB, Ethernet, serial) or wireless (e.g., cellular, 802.11, etc.) communications connectors. The accelerometer array 426 may include an X-axis accelerometer 426X, Y-axis accelerometer 426Y, and/or Z-axis accelerometer 426Z. The accelerometer array 426 may be used to determine the orientation of the commissioning device 210 in space (e.g., to measure the orientation of one of the PV modules of the solar panel system 102 as discussed herein). In addition to a touchscreen, the commissioning device 210 may include any of a number of known user input devices such as a built-in or external keyboard, mouse, trackpad, trackball, etc. (not shown).

Figure 5:
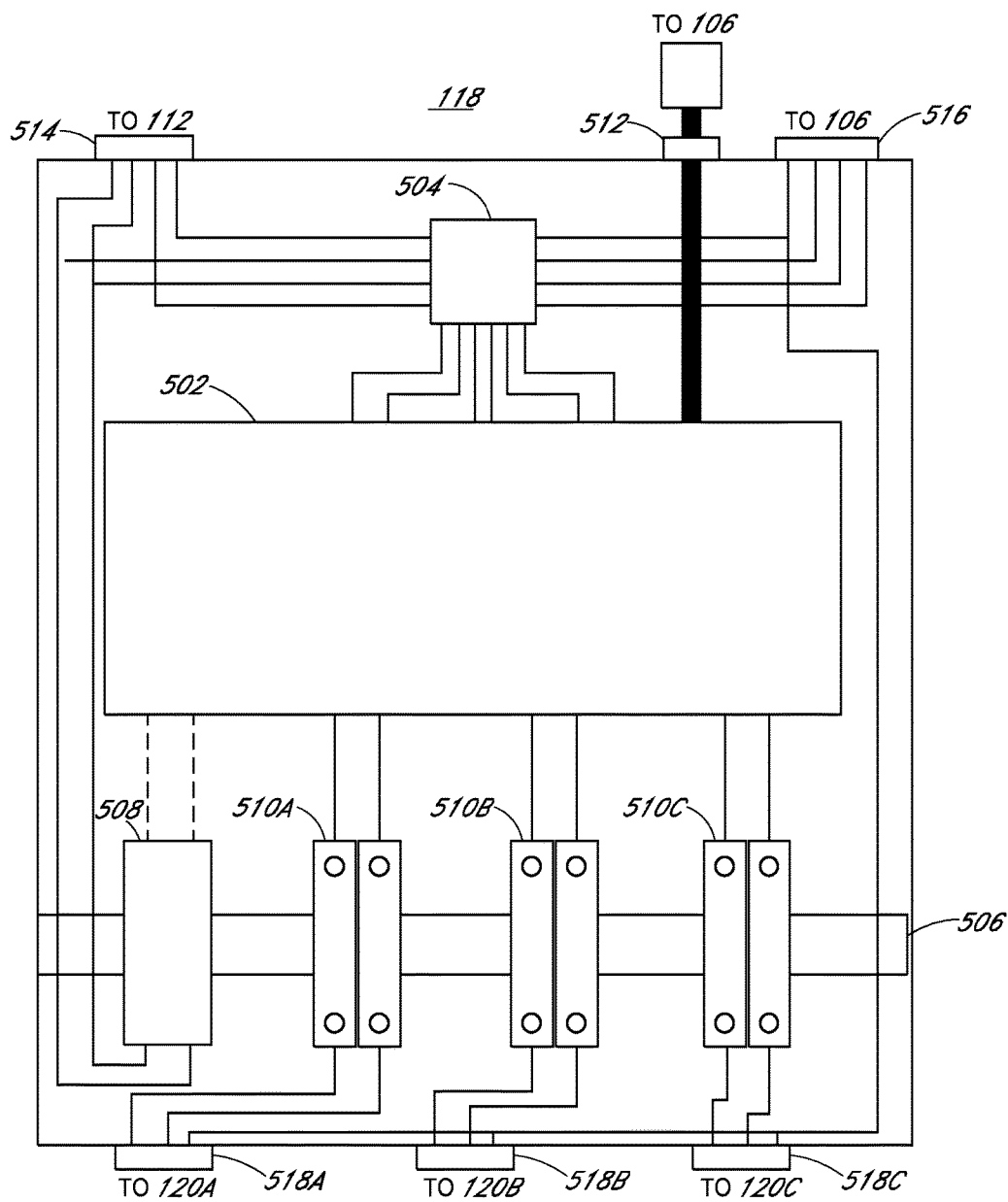
FIG. 5 illustrates a block diagram of an example aggregation panel in accordance with the presently described embodiments.

Referring now to FIG. 5, a block diagram of the internal components and interconnections of the agg panel 118 is shown. The agg panel 118 may include an agg panel switcher 502 (discussed in further detail in referring to FIG. 6), a junction box 504, a DIN rail 506, a DC power supply 508 for the agg panel switcher 502, circuit breakers 510, and communications port 512. The agg panel 118 may be coupled to the electric panel 112 and electric meter 110 via interconnection 514, the PV supervisor 106 via communications port 512 and/or interconnection 516, and branch circuits 120A, 120B, and 120C via the interconnections 518A, 518B, and 518C, respectively.

As shown in FIG. 5, the junction box 504 may gather the electrical connections between the various components interconnected to the agg panel 118. The DIN rail 506 may be a rail of a standard type widely used for mounting circuit breakers and industrial control equipment inside the agg panel 118. For example, the DIN rail 506 may secure DC power supply 508 and circuit breakers 510. The DC power supply 508 may convert AC power from the AC grid into DC power (e.g., 12 volts DC) to power the agg panel switcher 502. The circuit breakers 510A, 510B, and 510C may be any of a number of known and commercially available circuit breakers and may be used to break the connection between branch circuits 120A, 120B, and 120C, respectively, and thereby disconnect the power generated by the solar panel system 102 to allow a technician to service the agg panel 118, PV supervisor 106, energy storage device 114, etc. safely. The communications port 512 may be any of a number of known wired communications technologies (e.g., Ethernet, USB, DeviceNet, etc.) and may be coupled to the PV supervisor 106 (or other local controller or a remote controller via the network 202) to receive instructions.

The interconnection 514 may be used to transmit AC power from the solar panel system 102 with PLC information modulated thereon by the inverters 104 and/or PV supervisor from the agg panel to the electrical panel 112 and downstream utility grid. The interconnection 516 may be coupled to the PV supervisor 106 to receive instructions and information via PLC protocol. The interconnections 518 may receive AC or DC power and/or PLC communication from the solar panel system 102 via the various branch circuits 120.

Figure 6:
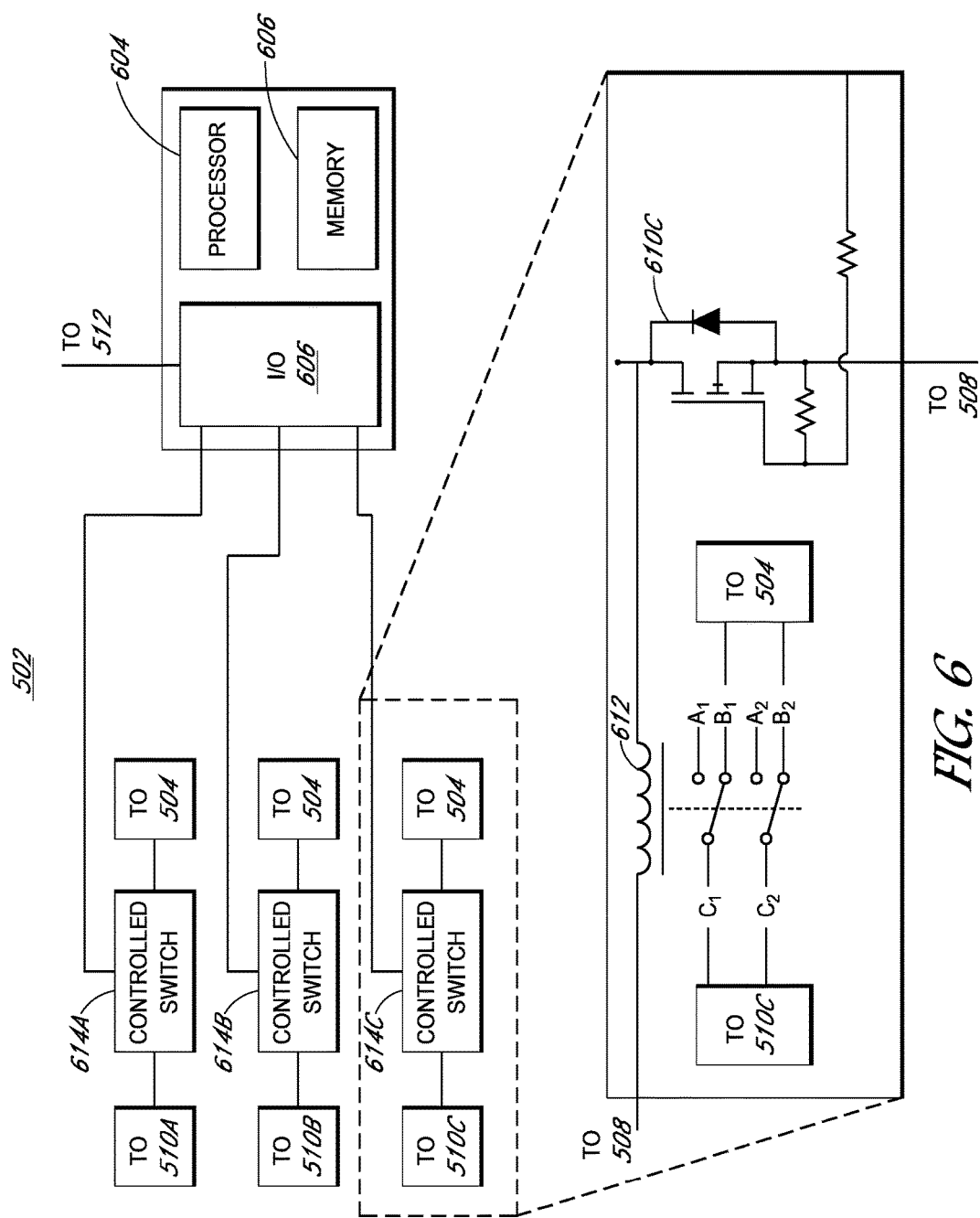
FIG. 6 illustrates a block diagram of an example aggregation panel controller in accordance with the presently described embodiments.

Referring now to FIG. 6, a block diagram of various components of the agg panel switcher 502 (also referred to herein as an "aggregation panel switcher") is shown, according to some embodiments. The agg panel switcher 502 includes a controller 602 that may be used to activate and deactivate one or more branch circuits 120 by activating and deactivating one or more controlled switches 614 (e.g., by outputting ON or OFF signals to the controlled switches 614). FIG. 6 shows three controlled switches 614: a first controlled switch 614A coupled to the first branch circuit 120A, a second controlled switch 614B coupled to the second branch circuit 120B, and a third controlled switch 614C coupled to the third branch circuit 120C, although it will be understood that fewer or more branch circuits 120 (and thus controlled switches 614) may be included. Depending on the type of controlled switch 614 used in the agg panel switcher 502, activating the controlled switch 614 may allow current to flow through the controlled switch 614 ("closing" the controlled switch 614) and deactivating the controlled switch 614 may prevent current from flowing through the controlled switch 614 ("opening" the controlled switch 614) in a normally-off controlled switch 614 or the inverse for a normally-on controlled switch 614. The controller 602 may include a processor 604, a memory 606, and an I/O controller 608. The memory 606 may store instructions that when executed by the processor 604 cause the controller to activate or deactivate controlled switches 614 to activate or deactivate branch circuits 120 as discussed herein. The I/O controller may receive input (e.g., commands to activate or deactivate controlled switches 614) from the PV supervisor 106 or other controller via the communications port 512.

In some embodiments, the controlled switches 614 may comprise transistors 610 used to activate or deactivate relays 612 (e.g., a DPDT relay). In FIG. 6, controlled switch 612C has been exploded to show a transistor 601C that may be used to activate or deactivate a relay 612C and thereby activate or deactivate branch circuit 120C. Controlled switches 614A and 614B may be similar to controlled switch 614C, having transistors 610A and 610B and relays 612A and 612B, respectively (not shown). The transistor 610C may be activated by the controller 602 outputting an ON signal to the gate of the transistor 610C or deactivated by the controller outputting an OFF signal to the gate of the transistor 610C. Alternatively, the controller 602 may activate or deactivate the relay 612C directly (not shown). The transistors may be FETs or BJT of normally-on or normally-off type. The relays 612 may be normally-on or normally-off type relays. Using normally-on transistors 610 and relays 612 may be more energy efficient than using normally-off type transistors 610 and relays 612 because once the commissioning process discussed herein is complete, the relays 612 may stay activated for the operating life of the electric system 100. Additionally or alternatively, the controlled switches 614 may be other types of controlled switches 614 such as controlled circuit breakers, solid-state relays, MOSFETs, combinations of relays and a current sensor, etc. In some embodiments, the controlled switch 614 may perform the actions associated with the commissioning process discussed herein and also serve the functions served by the circuit breakers 510. In such embodiments, the circuit breakers 510 may be removed from the agg panel 118.

Figure 7A:
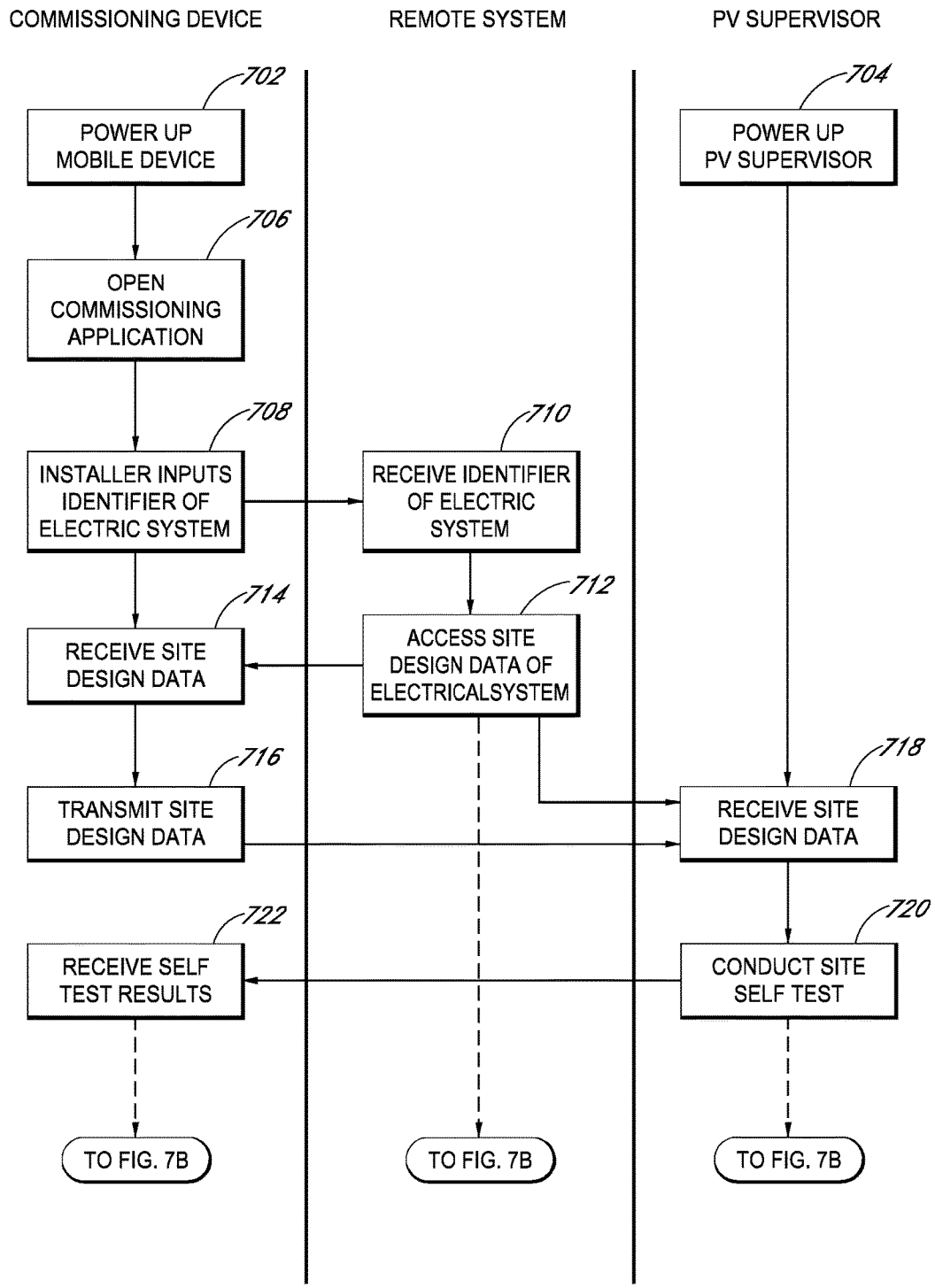
FIGS. 7A-7C depict an example solar power system commissioning method in accordance with the presently described embodiments.
Figure 7B:
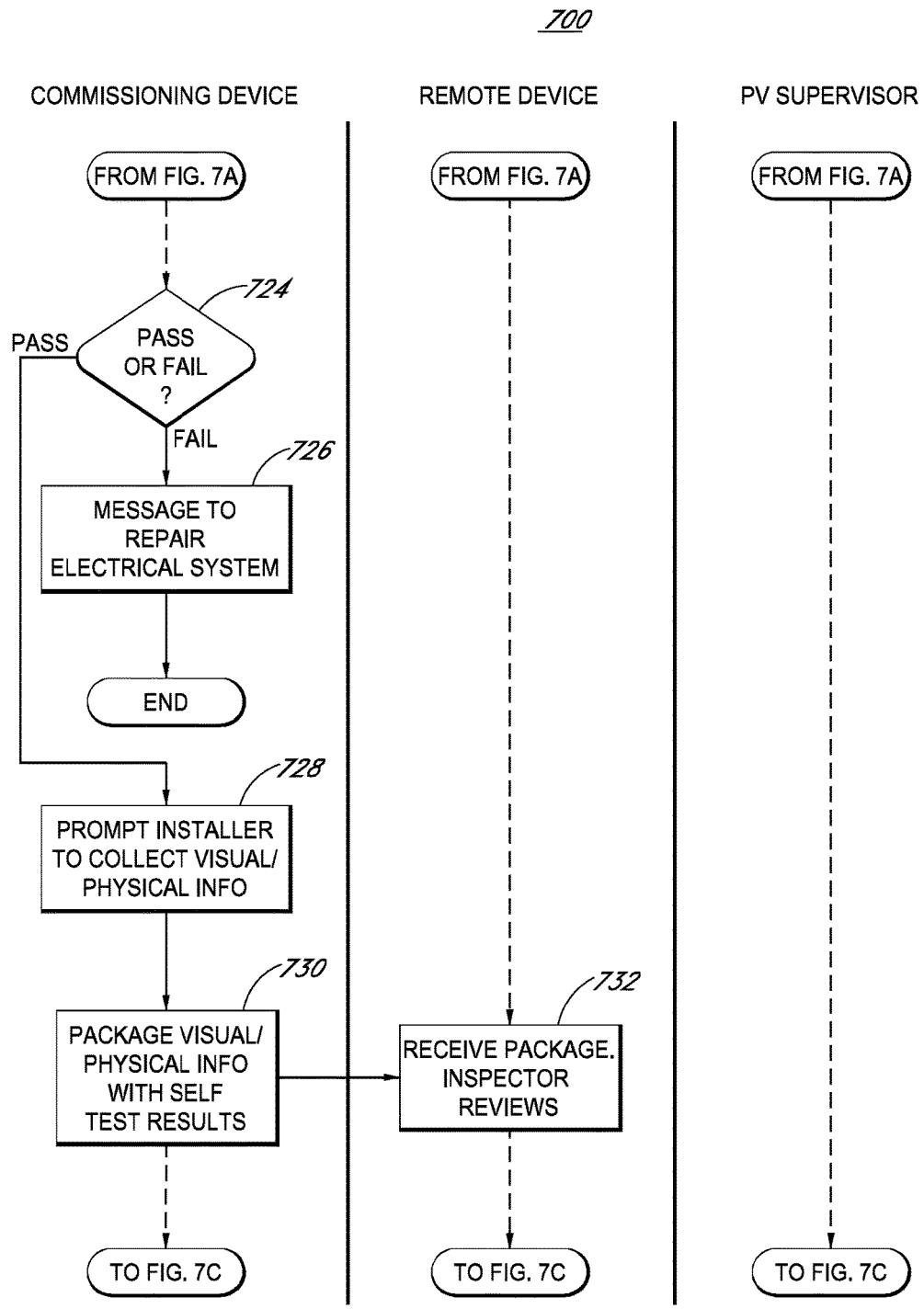
Figure 7C:
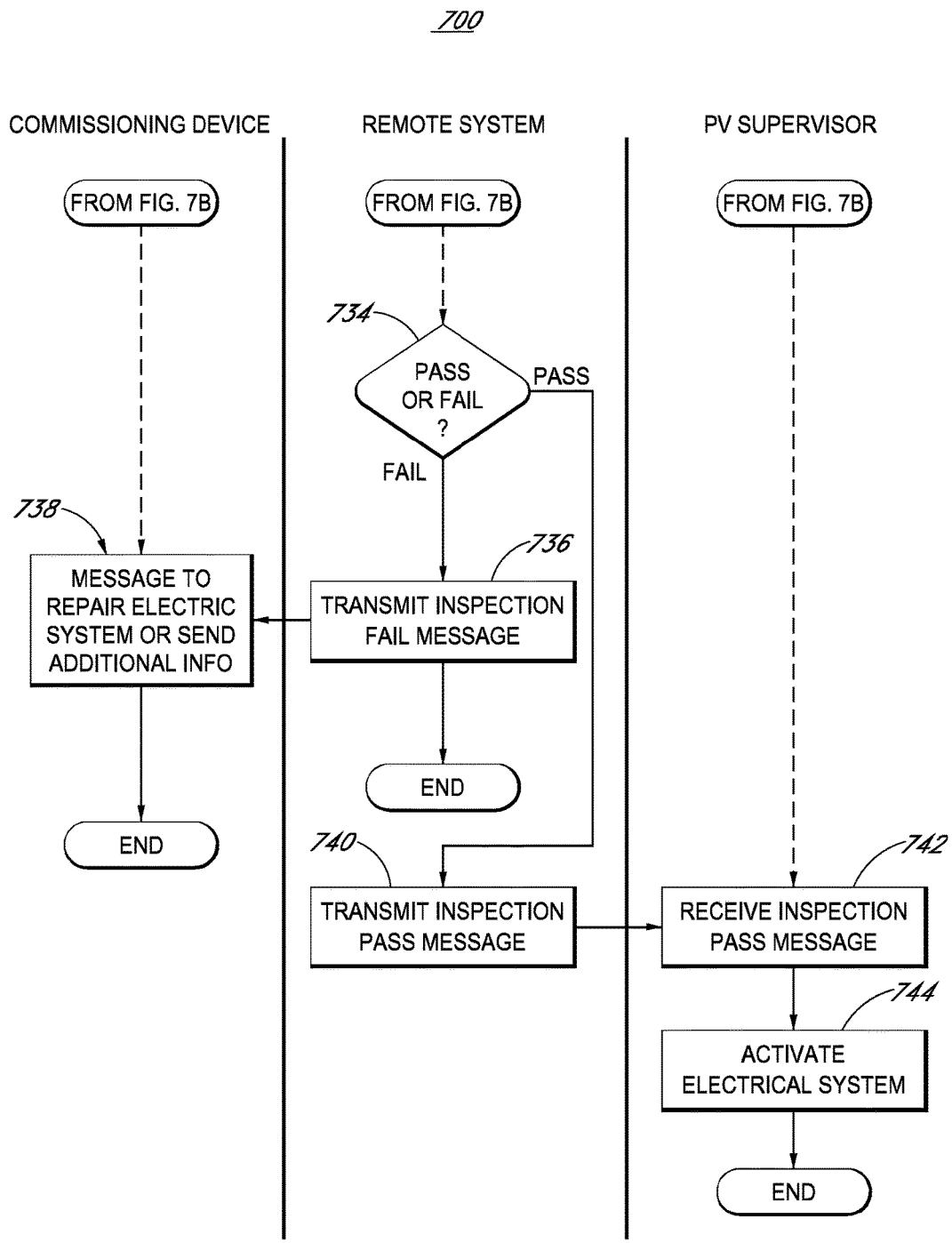

Referring now to FIGS. 7A-7C, block diagrams show a commissioning method 700 for activating, testing, and inspecting an electric system 100 in accordance with the presently described embodiments. As shown in FIGS. 7A-7C, the various steps of the commissioning method 700 may be performed by or with the commissioning device 210, one or more remote system 204, and PV supervisor 106. Some of the steps performed by the remote system 204 may be performed by one or more remote systems 204 working together in a cloud. Additionally, some steps (e.g., 710, 712) may be performed by a first remote system 204 and other steps (e.g., 732-740), may be performed by a second remote system 204. Further, additional steps may be performed, and steps in the commissioning method 700 may be omitted or performed in a different order than shown in FIGS. 7A-7C. Before the commissioning method 700 is performed, the electric system 100 has been permitted (if necessary), designed for installation at the site, and has been installed at the site. As discussed herein, the site design data of the electric system 100 may be used to commission and inspect the electric system 100. The commissioning method 700 may be performed by an installer using the commissioning device 210, the PV supervisor 106, and an inspector (e.g., utility, government, etc.) using the remote system 204.

At block 702 and block 704, the installer powers on the commissioning device 210 and the PV supervisor 106 to begin the commissioning method 700. At block 706, the commissioning application 416 is opened on the commissioning device 210 (e.g., by the installer or automatically). At block 708, the installer inputs an identifier of the electric system 100 on the commissioning device 210. The identifier could be a serial number of the electric system 100, a permit number for the electric system 100, a street address of the site, a geolocation of the site, a job number, etc. The commissioning device 210 then transmits the identifier of the electric system 100 to the remote system 204 via a wired or wireless connection. As discussed herein, the commissioning device 210 may communicate with the remote system 204 over the network 202 or through the PV supervisor 106 and then over the network 202. At block 710, the remote system 204 receives the identifier of the electric system 100.

At block 712, the remote system 204 uses the identifier of the electric system to look up the site design data for the particular electrical system 100 being commissioned and transmit the site design data to the commissioning device 210. The site design data of the electrical system 100 may include one or more of: a list of serial numbers of PV modules to be installed in the electric system 100, a total number of PV modules to be installed in the electric system 100, an expected voltage of the electric system 100, an expected power output range of the electric system 100, a list of serial numbers of PV modules in each branch circuit 120 (e.g., first branch circuit 120A, second branch circuit 120B, third branch circuit 120C), a total number of PV modules in each branch circuit 120, an expected voltage of each branch circuit 120, an expected power output of each branch circuit 120, an expected presence of an end cap 122 on each branch circuit 120, a tilt angle of one or more PV modules in each branch circuit 120, or a compass direction of one or more PV modules in each branch circuit 120. At block 714, the commissioning device 210 receives the site design data. At block 716, the commissioning device 210 transmits the site design data to the PV supervisor 106. Alternatively, the remote system 204 may send the site design date to the PV supervisor 106 directly. At block 718, the PV supervisor 106 receives the site design data (either directly from the remote system 204 or indirectly via the commissioning device 210). At block 720, the PV supervisor 106 performs a site self-test on the electric system 100 to determine whether the installed electric system 100 matches the site design data. Block 720 is discussed in further detail with reference to FIGS. 8A-8B herein. After completing the site self-test, the PV supervisor transmits the self-test results to the commissioning device 210.

At block 722, the commissioning device 210 receives the self-test results. Referring now to FIG. 7B, at block 724, the commissioning device 210 determines whether the self-test results indicate that the electric system 100 passed or failed the site self-test. If the electric system 100 failed the site self-test, the commissioning device 210 may display a message instructing the installer to repair the electric system 100 at block 726. The message instructing the installer to repair the electric system 100 may include a general message telling the installer that the system failed and to review the site design data to make repairs. The message instructing the installer to repair the electric system 100 may also include specific instructions indicating which repairs need to be performed such as one or more of: voltage/current/power below or above specification, serial numbers of modules listed in the site design that are missing from the electric system 100, serial numbers of modules present in the electric system 100 that are not listed in the site design data, too many or too few modules installed, serial numbers of modules installed on the incorrect branch circuit 120, etc. After reviewing the message instructing the installer to repair the electric system 100, the installer may make repairs (e.g., installing additional components to the electric system 100, removing components from the electric system 100, rearranging components of the electric system 100, etc.).

If the electric system 100 has passed the site self-test, at block 728 the commissioning device 210 may display a message instructing the installer to collect additional information about the electric system 100 to enable remote inspection of the electric system 100 by the inspector using the remote system 204. The additional information may include visual information such as one or more photographs of various components of the electric system 100 taken with the image capture device 420 or physical measurements of various aspects of the electric system 100 taken with the accelerometer array 426, compass 432, or measuring tools (e.g., measuring tape, builder's square, protractor, etc.). The photographs may be taken of various components of the electric system (e.g., solar panel system 102, wiring or connections between components, the inside of the agg panel 118, the inside of the electric panel 112, etc.) and may be timestamped and location stamped by software running on the commissioning device 210. The physical measurements may include measurements taken with the compass 432 (e.g., of the orientation of one or more components of the electric system 100 relative to North) or accelerometer array 426 (e.g., measurements of the tilt and position one or more components of the electric system 100). The installer may measure the tilt and/or position of a PV module of the electric system, for example, by setting the commissioning device 210 on a level surface to calibrate the accelerometer array 426 and then placing the commissioning device 210 on the PV module to determine the movement of the commissioning device 210 along the X, Y, and/or Z access to determine a position of the commissioning device 210 (and therefore PV module) in space relative to level. Additionally, the installer may be prompted to use measuring tools to take measurements (e.g., height, length, width, distance from roof, or angle, etc.) of the solar panel system 102 or other components of the electric system 100.

At block 730, the commissioning device 210 gathers all of the photographs and/or physical measurements and site self-test result into a package to transmit to the remote system 204. At block 732, the remote systems 204 receives the photographs and/or physical measurements and site self-test results. The inspector access the photographs and/or physical measurements and site self-test results to determine whether the electric system 100 passes or fails the inspection. This inspection may occur in real time while the installer is present on the site or asynchronously when the installer is not present at the site. The inspector's design may include reviewing the permit, reviewing the site design data, and photographs and/or physical measurements and site self-test results to determine that (1) the inspector has sufficient information (e.g., visual, physical) to inspect the electric system 100, (2) the installed electric system 100 matches the specifications and location stated in the permit, (3) the installed electric system 100 matches the specifications of the site design data, (4) the installed electric system 100 is up to code (e.g., connections between components are property made, system grounding is sufficient, etc.), etc. It will be understood that the inspector can fail the electric system 100 for any of a number of reasons depending on the inspector's responsibility and the requirements of the utility or jurisdiction.

Referring now to FIG. 7C, after reviewing the photographs and/or physical measurements and site self-test results, at block 734, the inspector determines whether the electric system 100 passes or fails inspection. If the electric system 100 fails inspection, at block 736 the remote system 204 transmits a message to the commissioning device 210 showing that the electric system 100 has failed the inspection. At block 738, the commissioning device 210 displays the message to the commissioning device showing that the electric system 100 has failed the inspection. The message to the commissioning device showing that the electric system 100 has failed the inspection may include one or more reasons explaining why the electric system 100 has failed (e.g., insufficient information, the electric system 100 does not match the specifications or location stated in the permit or site design data, the electric system 100 is not up to code, etc.) and/or additional information needed to complete the inspection and/or steps needed to repair the electric system 100. After reviewing the message to the commissioning device showing that the electric system 100 has failed the inspection, the installer may make repairs (e e.g., installing additional components to the electric system 100, removing components from the electric system 100, rearranging components of the electric system 100, etc.) or submit additional information (e.g., additional photographs and/or physical measurements).

If the electric system 100 passes inspection, at block 740 the remote system 204 transmits a message to the PV supervisor 106 showing that the electric system 100 has passed the inspection. Additionally, the remote system 204 may transmit a message to the commissioning device 210 showing that the electric system 100 has passed the inspection. At block 742, the PV supervisor 106 receives the message to the commissioning device 210 showing that the electric system 100 has passed the inspection. At block 744, the PV supervisor 106 activates the electric system 100 by activating all of the branch circuits 120, thereby connecting the solar panel system 102 to the utility grid.

Figure 8A:
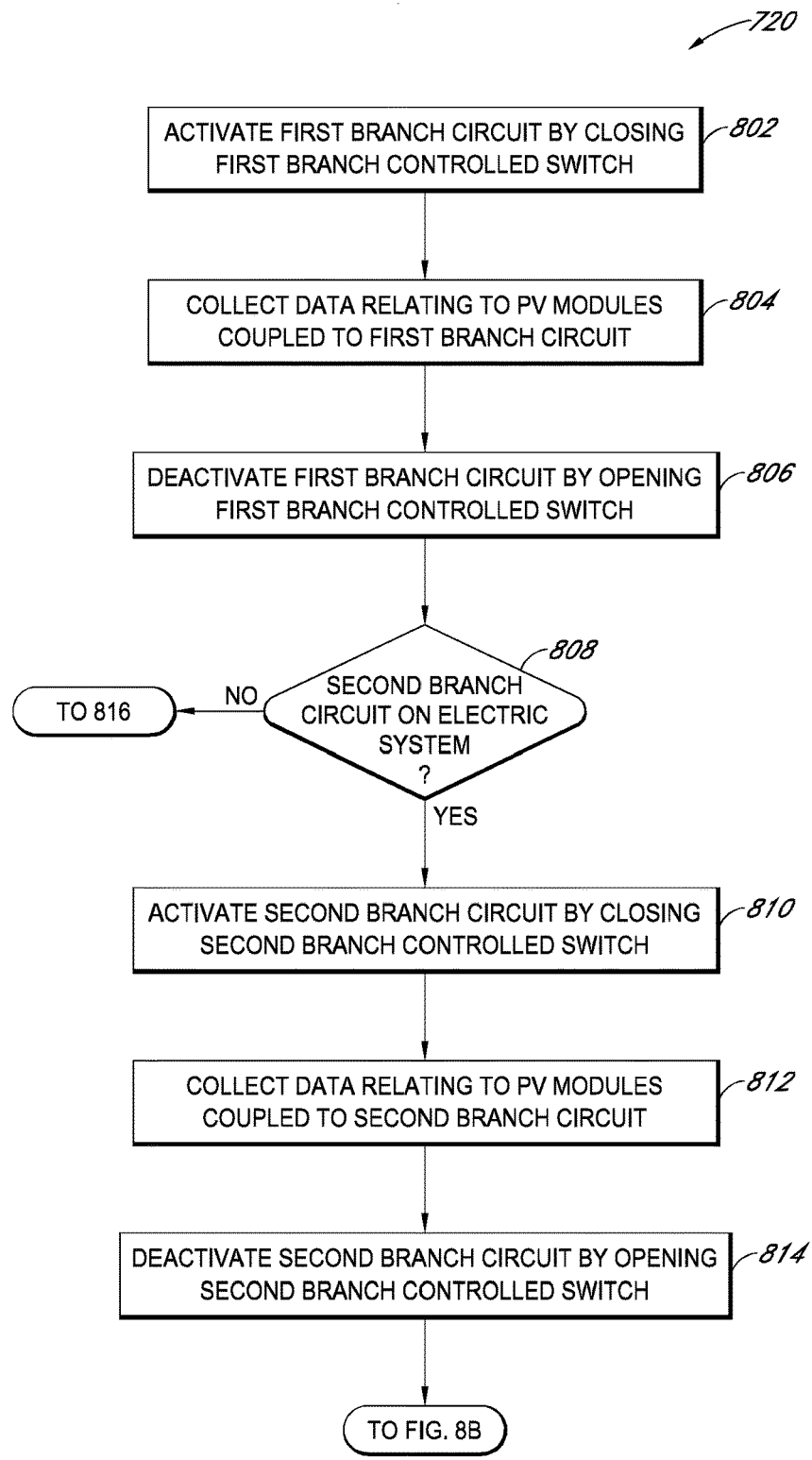
FIG. 8A-8B depict an example solar power system self-test method in accordance with the presently described embodiments.
Figure 8B:
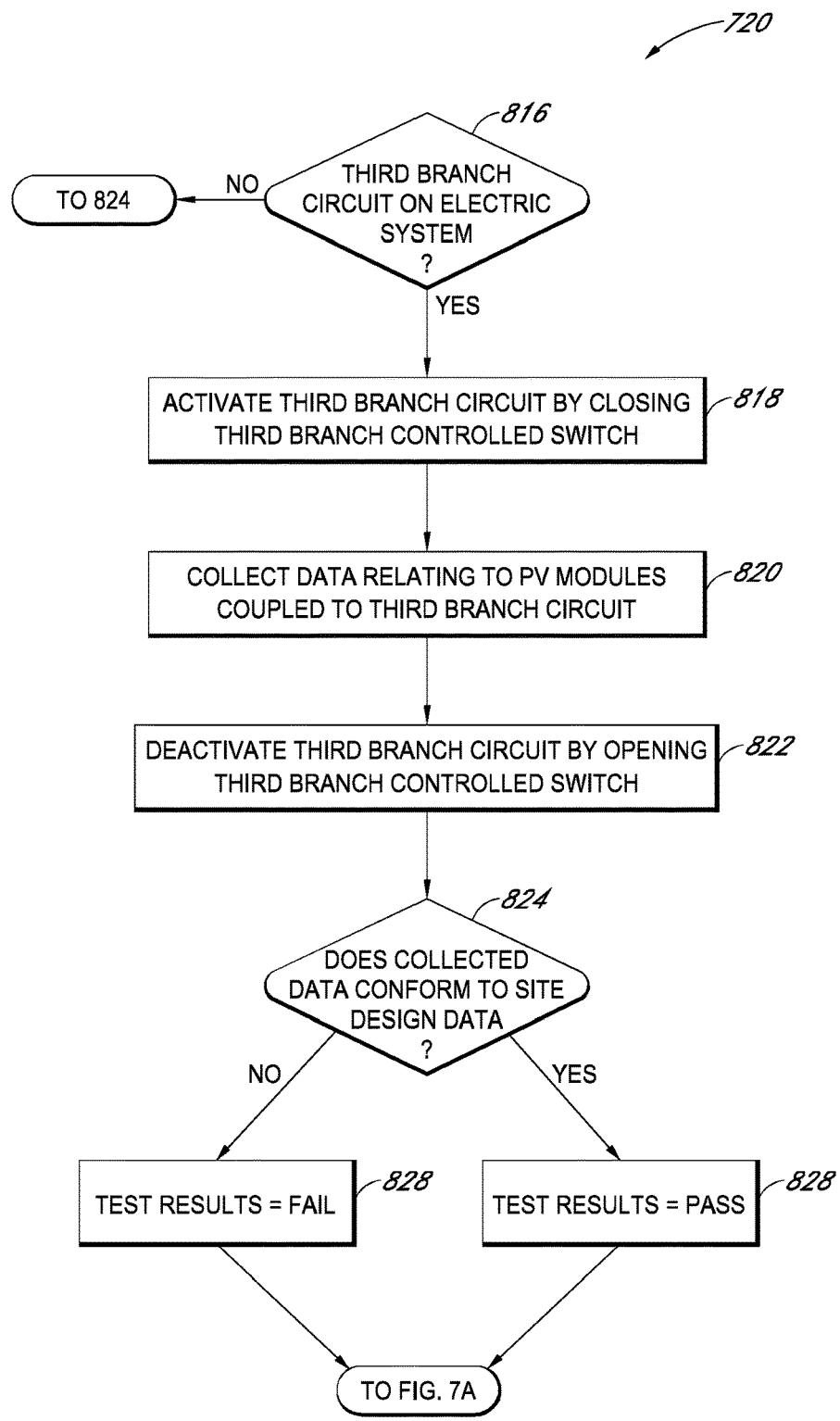

Referring now to FIGS. 8A-8B, block diagrams show the steps performed by the PV supervisor 106 during the self-test electric system 100 of block 720 in accordance with the presently described embodiments. While FIGS. 8A-8B relate to an electric system 100 that includes three or fewer branch circuits 120, it will be understood that the self-test process could be used on an electric system 100 with more than three branch circuits 120. At block 802, the PV supervisor 106 activates the first branch circuit 120A by activating the first branch controlled switch 614 (e.g., the transistor 610A and relay 612A).

At block 804, the PV supervisor 106 gathers information relating to the PV modules of the solar panel system 102 coupled to first branch circuit 120A. This information may be electrical measurements of the first branch circuit 120A

(e.g., power output of the first branch circuit 120A, voltage output of the first branch circuit 120A, current output of the first branch circuit 120A), a measurement indicating the presence of an end cap 122 on a MI 104 on the branch circuit 120A, or communications from components of the first branch circuit 120A (e.g., inverters 104, DC optimizers). The communications from components of the first branch circuit 120A may include serial numbers for the PV modules installed on the first branch circuit 120A (e.g., transmitted by the inverters 104 or DC optimizers), a response to a poll message from the PV supervisor 106 requesting a response from each inverter 104 or DC optimizer, or a message indicating the presence of an end cap 122 on a MI 104 on the branch circuit 120A. From this gathered information, the PV supervisor 106 may determine one or more of: a list of serial numbers of PV modules on the first branch circuit 120A, a total number of PV modules on the first branch circuit 120, a total voltage of the first branch circuit 120A, a current output of the first branch circuit 120A, a power output of the first branch circuit 120A, or a presence of an end cap 122 on the first branch circuit 120A. At block 806, the PV supervisor 106 deactivates the first branch circuit 120A by deactivating the first branch controlled switch 614 (e.g., the transistor 610A and relay 612A).

At block 808, if the electric system 100 does not include a second branch circuit 120B, the self-test process jumps to block 816. If the electric system 100 includes a second branch circuit 120B, at block 810 the PV supervisor 106 activates the second branch circuit 120B by activating the second branch controlled switch 614 (e.g., the transistor 610B and relay 612B). At block 812, the PV supervisor 106 gathers information relating to the PV modules of the solar panel system 102 coupled to second branch circuit 120B. This information may be electrical measurements of the second branch circuit 120B (e.g., power output of the second branch circuit 120B, voltage output of the second branch circuit 120B, current output of the second branch circuit 120B), a measurement indicating the presence of an end cap 122 on a MI 104 on the branch circuit 120B, or communications from components of the second branch circuit 120B (e.g., inverters 104, DC optimizers). The communications from components of the second branch circuit 120B may include serial numbers for the PV modules installed on the second branch circuit 120B (e.g., transmitted by the inverters 104 or DC optimizers), a response to a poll message from the PV supervisor 106 requesting a response from each inverter 104 or DC optimizer, or a message indicating the presence of an end cap 122 on a MI 104 on the branch circuit 120B. From this gathered information, the PV supervisor 106 may determine one or more of: a list of serial numbers of PV modules on the second branch circuit 120B, a total number of PV modules on the second branch circuit 120B, a total voltage of the second branch circuit 120B, a current output of the second branch circuit 120B, a power output of the second branch circuit 120B, or a presence of an end cap 122 on the second branch circuit 120B. At block 814, the PV supervisor 106 deactivates the second branch circuit 120B by deactivating the second branch controlled switch 614 (e.g., the transistor 610B and relay 612B).

Referring now to FIG. 8B, at block 816 if the electric system 100 does not include a third branch circuit 120C, the self-test process jumps to block 824. If the electric system 100 includes a third branch circuit 120C, at block 818 the PV supervisor 106 activates the third branch circuit 120C by activating the third branch controlled switch 614 (e.g., the transistor 610C and relay 612C). At block 820, the PV supervisor 106 gathers information relating to the PV modules of the solar panel system 102 coupled to third branch circuit 120C. This information may be electrical measurements of the third branch circuit 120C (e.g., power output of the third branch circuit 120C, voltage output of the third branch circuit 120C, current output of the third branch circuit 120C) a measurement indicating the presence of an end cap 122 on a MI 104 on the branch circuit 120C, or communications from components of the third branch circuit 120C (e.g., inverters 104, DC optimizers). The communications from components of the third branch circuit 120C may include serial numbers for the PV modules installed on the third branch circuit 120C (e.g., transmitted by the inverters 104 or DC optimizers), a response to a poll message from the PV supervisor 106 requesting a response from each inverter 104 or DC optimizer, or a message indicating the presence of an end cap 122 on a MI 104 on the branch circuit 120C. From this gathered information, the PV supervisor 106 may determine one or more of: a list of serial numbers of PV modules on the third branch circuit 120C, a total number of PV modules on the third branch circuit 120C, a total voltage of the third branch circuit 120C, a current output of the third branch circuit 120C, a power output of the third branch circuit 120C, or a presence of an end cap 122 on the first branch circuit 120C. At block 822, the PV supervisor 106 deactivates the third branch circuit 120C by deactivating the third branch controlled switch 614 (e.g., the transistor 610C and relay 612C).

At block 824, the PV supervisor 106 determines whether the information gathered relating one of more of the first branch circuit 120A, second branch circuit 120B, or third branch circuit 120C conforms to the site design data. The PV supervisor 106 may make this determination by one of more of:

(1) determining whether the list of serial numbers of PV modules in the first branch circuit 120A of the site design data matches the serial numbers for each PV module in the first branch circuit 120A of the gathered information, the list of serial numbers of PV modules in the second branch circuit 120B of the site design data matches the serial numbers for each PV module in the second branch circuit 120B of the gathered information, and/or the list of serial numbers of PV modules in the third branch circuit 120C of the site design data matches the serial numbers for each PV module in the third branch circuit 120C of the gathered information;

(2) determining whether the total number of PV modules in the first branch circuit 120A of the site design data matches the number of PV module in the first branch circuit 120A of the gathered information, the total number of PV modules in the second branch circuit 120B of the site design data matches the number of PV module in the second branch circuit 120B of the gathered information, and/or the total number of PV modules in the third branch circuit 120C of the site design data matches the number of PV module in the third branch circuit 120C of the gathered information;

(3) determining whether the expected voltage of the first branch circuit 120A of the site design data matches the voltage of the first branch circuit 120A of the gathered information, the expected voltage of the second branch circuit 120B of the site design data matches the voltage of the second branch circuit 120B of the gathered information, and/or the expected voltage of the third branch circuit 120C of the site design data matches the voltage of the third branch circuit 120C of the gathered information;

(4) determining whether the expected power output of the first branch circuit 120A of the site design data matches the power output of the first branch circuit 120A of the gathered information, the expected power output of the second branch circuit 120B of the site design data matches the power output of the second branch circuit 120B of the gathered information, and/or the expected power output of the third branch circuit 120C of the site design data matches the power output of the third branch circuit 120C of the gathered information; or (5) determining, if the presence of an end cap 122 is expected on one or more of the first branch circuit 120A, second branch circuit 120B, or third branch circuit 120C, whether the expected end cap 122 is present on one or more of the first branch circuit 120A, second branch circuit 120B, or third branch circuit 120C.

As discussed herein, the PV supervisor 106 may gather information on and self-test electric systems 100 with a first branch circuit 120A, a first branch circuit 120A and a second branch circuit 120B, or a first branch circuit 120A and a second branch circuit 120B and a third branch circuit 120C, etc. If the gathered information does not conform to the site design data, at block 826 the PV supervisor 106 may generate a self-test result indicating that the electric system 100 failed the self-test. The failed self-test result may indicate how the electric system does not conform to the site design data (e.g., lower than expected number of PV modules, PV module serial numbers not in the site design data, etc.). If the gathered information conforms to the site design data, at block 828 the PV supervisor 106 may generate a self-test result indicating that the electric system 100 passed the self-test. After generating a self-test result, the PV supervisor 106 transmits the self-test result to the commissioning device 210 as discussed herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for commissioning an electric system comprising:
    installing the electric system, wherein the electric system includes:
        a local solar power controller, and
        a first branch circuit in communication with the local solar power controller, wherein the first branch circuit includes a first branch controlled switch and a plurality of photovoltaic (PV) modules;
    activating the local solar power controller;
    receiving, at a commissioning device, an identifier of the electric system;
    receiving, at the local solar power controller, site design data from a remote system,
        wherein the site design data relates to a predetermined electric system site design of the electric system;
    activating, with the local solar power controller, the first branch circuit by closing the first branch controlled switch;
    collecting, with the local solar power controller, first data relating to the PV modules of the first branch circuit;
    deactivating, with the local solar power controller, the first branch circuit by opening the first branch controlled switch;
    analyzing, with the local solar power controller, the first data and site design data to determine whether the electric system conforms to the predetermined electric system site design; and
    when the electric system conforms to the predetermined electric system site design:
        generating a self-test pass indicator,
        transmitting the self-test pass indicator from the local solar power controller to the commissioning device,
        receiving at the commissioning device one or more indicators of physical characteristics of the electric system, and transmitting, with the commissioning device, the self-test pass indicator and the one or more indicators of physical characteristics of the electric system to the remote system.

2. The method for commissioning an electric system of claim 1 further comprising:
    receiving an inspector pass indicator from the remote system; and
    activating, with the local solar power controller, the first branch circuit by closing the first branch controlled switch.

3. The method for commissioning an electric system of claim 1 further comprising:
    when the electric system does not conform to the predetermined electric system site design:
        generating a self-test fail indicator,
        transmitting the self-test fail indicator from the local solar power controller to the commissioning device,
        modifying the electric system by one or more of adding additional components, removing components, or rearranging components.

4. The method for commissioning an electric system of claim 1 further comprising:
    receiving an inspector fail indicator from the remote system; and
    modifying the electric system by one or more of adding additional components, removing components, or rearranging components.

5. The method for commissioning an electric system of claim 1 wherein the identifier of the electric system includes one or more of an electric system serial number, a street address of the electric system, a geolocation of the electric system, or a permit number.

6. The method for commissioning an electric system of claim 1 wherein the electric system further comprises a second branch circuit in communication with the local solar power controller, wherein the second branch circuit includes a second branch controlled switch and a plurality of PV modules; the method further comprising:

activating, with the local solar power controller, a second branch circuit by closing a second branch controlled switch;

collecting, with the local solar power controller, second data relating to PV modules coupled to the second branch circuit;

deactivating, with the local solar power controller, the second branch circuit by opening the second branch controlled switch; and analyzing, with the local solar power controller, the second data and site design data to determine whether the electric system conforms to the predetermined electric system site design.

7. The method for commissioning an electric system of claim 6 wherein the site design data includes one or more of:
a list of serial numbers of PV modules to be installed in the electric system, a total number of PV modules to be installed in the electric system,
an expected voltage of the electric system,
an expected power output of the electric system,
a list of serial numbers of PV modules in the first branch circuit,
a list of serial numbers of PV modules in the second branch circuit, a total number of PV modules in the first branch circuit,
a total number of PV modules in the second branch circuit, an expected voltage of the first branch circuit,
an expected voltage of the second branch circuit,
an expected power output of the first branch circuit,
an expected power output of the second branch circuit,
an expected presence of an end cap on the first branch circuit,
an expected presence of an end cap on the second branch circuit, a tilt angle of one or more PV modules in the first branch circuit,
a tilt angle of one or more PV modules in the second branch circuit, and
a compass direction of one or more PV modules in the first branch circuit, or a compass direction of one or more PV modules in the second branch circuit.

8. The method for commissioning an electric system of claim 7 wherein:
the first data relating to the PV modules includes one or more of serial numbers for each PV module in the first branch circuit, a total number of PV modules in the first branch circuit, a voltage of the first branch circuit, a power output of the first branch circuit, or a presence of an end cap on the first branch circuit; and
the second data relating to the PV modules includes one or more of serial numbers for each PV module in the second branch circuit, a total number of PV modules in the second branch circuit, a voltage of the second branch circuit, a power output of the second branch circuit, or a presence of an end cap on the second branch circuit.

9. The method for commissioning an electric system of claim 8 wherein analyzing, with the local solar power controller, the first data, second data, and site design data to determine whether the electric system conforms to the predetermining electric system site design includes one or more of:
determining whether the list of serial numbers of PV modules in the first branch circuit of the site design data matches the serial numbers for each PV module in the first branch circuit of the first data and the list of serial numbers of PV modules in the second branch circuit of the site design data matches the serial numbers for each PV module in the first branch circuit of the first data;
determining whether the total number of PV modules in the first branch circuit of the site design data matches the total number of PV module in the first branch circuit of the first data and the total number of PV modules in the second branch circuit of the site design data matches the total number of PV modules in the second branch circuit of the second data;
determining whether the expected voltage of the first branch circuit of the site design data matches the voltage of the first branch circuit of the first data and the expected voltage of the second branch circuit of the site design data matches the voltage of the second branch circuit of the second data;
determining whether the expected power output of the first branch circuit of the site design data matches the power output of the first branch circuit of the first data and the expected power output of the second branch circuit of the site design data matches the power output of the second branch circuit of the second data; or
determining, if the presence of an end cap is expected on one or more of the first branch circuit or second branch circuit, whether the expected end cap is present on one or more of the first branch circuit or second branch circuit.

10. The method for commissioning an electric system of claim 1 wherein the one or more indicators of physical characteristics of the electric system includes one or more images of the electric system, wherein each image has one of more of a timestamp or location stamped.

11. The method for commissioning an electric system of claim 1 wherein the one or more indicators of physical characteristics of the electric system includes one or more of a tilt angle or compass direction of one or more PV modules.

12. An automatic site commissioning method for commissioning an electric system comprising:
receiving, at a commissioning device, an identifier of the electric system;
receiving, at a local solar power controller, site design data from a remote system, wherein the site design data relates to a predetermined electric system site design of the electric system;
activating, with the local solar power controller, a first branch circuit by closing a first branch controlled switch;
collecting, with the local solar power controller, first data relating to photovoltaic (PV) modules coupled to the first branch circuit;
deactivating, with the local solar power controller, the first branch circuit by opening the first branch controlled switch;
analyzing, with the local solar power controller, the first data and site design data to determine whether the electric system conforms to the predetermining electric system site design; and
when the electric system conforms to the predetermined electric system site design:
generating a self-test pass indicator,
transmitting the self-test pass indicator from the local solar power controller to the commissioning device,
receiving, at the commissioning device one or more indicators of physical characteristics of the electric system, and transmitting, with the commissioning device, the self-test pass indicator and the one or more indicators of physical characteristics of the electric system to the remote system.

13. The automatic site commissioning method of claim 12 further comprising:
activating, with the local solar power controller, a second branch circuit by closing a second branch controlled switch;
collecting, with the local solar power controller, second data relating to PV modules coupled to the second branch circuit;
deactivating, with the local solar power controller, the second branch circuit by opening the second branch controlled switch; and
analyzing, with the local solar power controller, the second data and site design data to determine whether the electric system conforms to the predetermining electric system site design.

14. The automatic site commissioning method of claim 13 wherein the site design data includes one or more of:
a list of serial numbers of PV modules to be installed in the electric system,
a total number of PV modules to be installed in the electric system,
an expected voltage of the electric system,
an expected power output of the electric system,
a list of serial numbers of PV modules in the first branch circuit,
a list of serial numbers of PV modules in the second branch circuit,
a total number of PV modules in the first branch circuit,
a total number of PV modules in the second branch circuit,
an expected voltage of the first branch circuit,
an expected voltage of the second branch circuit,
an expected power output of the first branch circuit,
an expected power output of the second branch circuit, or
an expected presence of an end cap on the first branch circuit,
an expected presence of an end cap on the second branch circuit,
a tilt angle of one or more PV modules in the first branch circuit,
a tilt angle of one or more PV modules in the second branch circuit,
a compass direction of one or more PV modules in the first branch circuit, or
a compass direction of one or more PV modules in the second branch circuit.

15. The automatic site commissioning method of claim 14 wherein:
the first data relating to the PV modules includes one or more of serial numbers for each PV module in the first branch circuit, a total number of PV modules in the first branch circuit, a voltage of the first branch circuit, a power output of the first branch circuit, or a presence of an end cap on the first branch circuit; and
the second data relating to the PV modules includes one or more of serial numbers for each PV module in the second branch circuit, a total number of PV modules in the second branch circuit, a voltage of the second branch circuit, a power output of the second branch circuit, or a presence of an end cap on the second branch circuit.

16. The automatic site commissioning method of claim 15 wherein analyzing, with the local solar power controller, the first data, second data, and site design data to determine whether the electric system conforms to the predetermining electric system site design includes one or more of:
determining whether the list of serial numbers of PV modules in the first branch circuit of the site design data matches the serial numbers for each PV module in the first branch circuit of the first data and the list of serial numbers of PV modules in the second branch circuit of the site design data matches the serial numbers for each PV module in the first branch circuit of the first data;
determining whether the total number of PV modules in the first branch circuit of the site design data matches the total number of PV module in the first branch circuit of the first data and the total number of PV modules in the second branch circuit of the site design data matches the total number of PV modules in the second branch circuit of the second data;
determining whether the expected voltage of the first branch circuit of the site design data matches the voltage of the first branch circuit of the first data and the expected voltage of the second branch circuit of the site design data matches the voltage of the second branch circuit of the second data;
determining whether the expected power output of the first branch circuit of the site design data matches the power output of the first branch circuit of the first data and the expected power output of the second branch circuit of the site design data matches the power output of the second branch circuit of the second data; or
determining, if the presence of an end cap is expected on one or more of the first branch circuit or second branch circuit, whether the expected end cap is present on one or more of the first branch circuit or second branch circuit.

17. An electric system comprising:
a first branch circuit, wherein the first branch circuit includes a first branch controlled switch and a plurality of photovoltaic (PV) modules; and
a local solar power controller including:
a processor, and
a tangible, computer-readable memory storing instructions that when executed by the processor cause the local solar power controller to:
receive, at a commissioning device, an identifier of the electric system;
receive site design data, from a remote system, relating to a predetermined electric system site design of the electric system,
activate the first branch circuit by closing the first branch controlled switch,
collect first data relating to PV modules coupled to the first branch circuit,
deactivate the first branch circuit by opening the first branch controlled switch,
analyze the first data and site design data to determine whether the electric system conforms to the predetermined electric system site design, and
when the electric system conforms to the predetermined electric system site design:
generate a self-test pass indicator,
transmit the self-test pass indicator from the local solar power controller to the commissioning device,
receive, at the commissioning device one or more indicators of physical characteristics of the electric system, and transmit, with the commissioning device, the self-test pass indicator and one or more indicators of physical characteristics of the electric system to the remote system.

18. The electric system of claim 17 further comprising:

a second branch circuit, wherein the second branch circuit includes a second branch controlled switch and a plurality of PV modules;

wherein the tangible, computer-readable memory further stores instructions that when executed by the processor cause the local solar power controller to:

activate the second branch circuit by closing the second branch controlled switch, collect second data relating to PV modules coupled to the second branch circuit, deactivate the second branch circuit by opening the second branch controlled switch, and analyze the second data and site design data to determine whether the electric system conforms to the predetermined electric system site design.

19. The electric system of claim 18, wherein the first branch circuit controlled switch comprises a first branch circuit relay transistor in communication with a first branch circuit relay;

wherein the second branch circuit controlled switch comprises a second branch circuit relay transistor in communication with a second branch circuit relay; and wherein the first branch controlled switch and the second branch controlled switch are disposed in an aggregation panel switcher, the aggregation panel switcher including:

a relay housing controller in communication with the first branch circuit relay transistor and the second branch circuit relay transistor, the relay housing controller including:

a processor;

a tangible, computer-readable memory storing instructions that when executed by the processor cause the relay housing controller to:

receive a command from the local solar power controller to activate one or more of the first branch circuit relay or second branch circuit relay, receive a command from the local solar power controller to deactivate one or more of the first branch circuit relay or second branch circuit relay, activate the first branch circuit relay by outputting an ON signal to a gate of the first branch circuit relay transistor, deactivate the first branch circuit relay by outputting an OFF signal to the gate of the first branch circuit relay transistor, activate the second branch circuit relay by outputting an ON signal to the gate of the second branch circuit relay transistor, and deactivate the second branch circuit relay by outputting an OFF signal to the gate of the second branch circuit relay transistor.

20. The electric system of claim 19 wherein:

the first branch controlled switch is a normally-on type controlled switch; and the second branch controlled switch is a normally-off type controlled switch.

* * * * *